(12) United States Patent
Aragaki

(10) Patent No.: US 9,336,429 B2
(45) Date of Patent: May 10, 2016

(54) NECROTIC CELL REGION DETECTION APPARATUS AND METHOD OF THE SAME, AND NON-TRANSITORY COMPUTER READABLE STORAGE MEDIUM TO STORE A NECROTIC CELL REGION DETECTION PROGRAM

(71) Applicant: OLYMPUS CORPORATION, Shibuya-ku, Tokyo (JP)

(72) Inventor: Hideya Aragaki, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/600,688

(22) Filed: Jan. 20, 2015

(65) Prior Publication Data

US 2015/0131889 A1    May 14, 2015

Related U.S. Application Data

(63) Continuation of application No. PCT/JP2013/070105, filed on Jul. 24, 2013.

(30) Foreign Application Priority Data

Jul. 31, 2012    (JP) ................... 2012-169600

(51) Int. Cl.
*G06K 9/00*    (2006.01)
*G06T 7/00*    (2006.01)
(Continued)

(52) U.S. Cl.
CPC .......... *G06K 9/0014* (2013.01); *G06K 9/00147* (2013.01); *G06K 9/6215* (2013.01); *G06T 7/0012* (2013.01); *G06T 7/402* (2013.01);
(Continued)

(58) Field of Classification Search
None
See application file for complete search history.

(56) References Cited

U.S. PATENT DOCUMENTS 7,396,654 B2 *   7/2008   Hayes ................. C12Q 1/6883
                                                           435/4
7,747,308 B2 *   6/2010   Hundley ............... A61B 5/055
                                                           382/131
(Continued)

FOREIGN PATENT DOCUMENTS

JP    2004053498 A    2/2004
JP    2004061403 A    2/2004
(Continued)

OTHER PUBLICATIONS

International Search Report (ISR) dated Sep. 10, 2013 issued in International Application No. PCT/JP2013/070105.
(Continued)

*Primary Examiner* — Randolph I Chu
(74) *Attorney, Agent, or Firm* — Holtz, Holtz & Volek PC

(57) ABSTRACT

A necrotic cell region detection apparatus includes an image acquiring unit, a segmentation unit, a band separate unit, a feature value calculating unit, a luminance calculating unit, and a judging unit. The image acquiring unit acquires a cell image. The segmentation unit divides the cell image into multiple regions so that a local imaging properties. The band separate unit separates a low-band image and a high-band image. The judging unit forms a feature space composed of the texture feature value calculated by the feature value calculating unit and the luminance average value calculated by the luminance calculating unit, and judges a region formed by necrotic cell in the feature space.

15 Claims, 7 Drawing Sheets

(51) Int. Cl.
*G06T 7/40* (2006.01)
*G06K 9/62* (2006.01)

(52) U.S. Cl.
CPC .......... *G06T2207/10056* (2013.01); *G06T 2207/30024* (2013.01)

(56) References Cited

U.S. PATENT DOCUMENTS

| | | | | |
|---|---|---|---|---|
| 8,160,344 | B2* | 4/2012 | Shinagawa | G06T 7/0081 382/131 |
| 8,731,261 | B2* | 5/2014 | Ghosh | G06T 7/0081 378/1 |
| 8,902,306 | B2 | 12/2014 | Mimura et al. | |
| 2005/0014217 | A1* | 1/2005 | Mattheakis | G01N 33/5067 435/40.5 |
| 2007/0236491 | A1* | 10/2007 | Hundley | A61B 5/055 345/418 |
| 2012/0076390 | A1* | 3/2012 | Potts | G06T 7/0014 382/133 |
| 2013/0051665 | A1* | 2/2013 | Shinozaki | G06T 5/00 382/167 |
| 2014/0307079 | A1* | 10/2014 | Aragaki | G06T 7/0083 348/79 |

FOREIGN PATENT DOCUMENTS

| | | |
|---|---|---|
| JP | 2007020449 A | 2/2007 |
| JP | 2010022318 A | 2/2010 |

OTHER PUBLICATIONS

International Preliminary Report on Patentability (IPRP) including Written Opinion (in English) dated Feb. 12, 2015, issued in parent International Application No. PCT/JP2013/070105.

\* cited by examiner

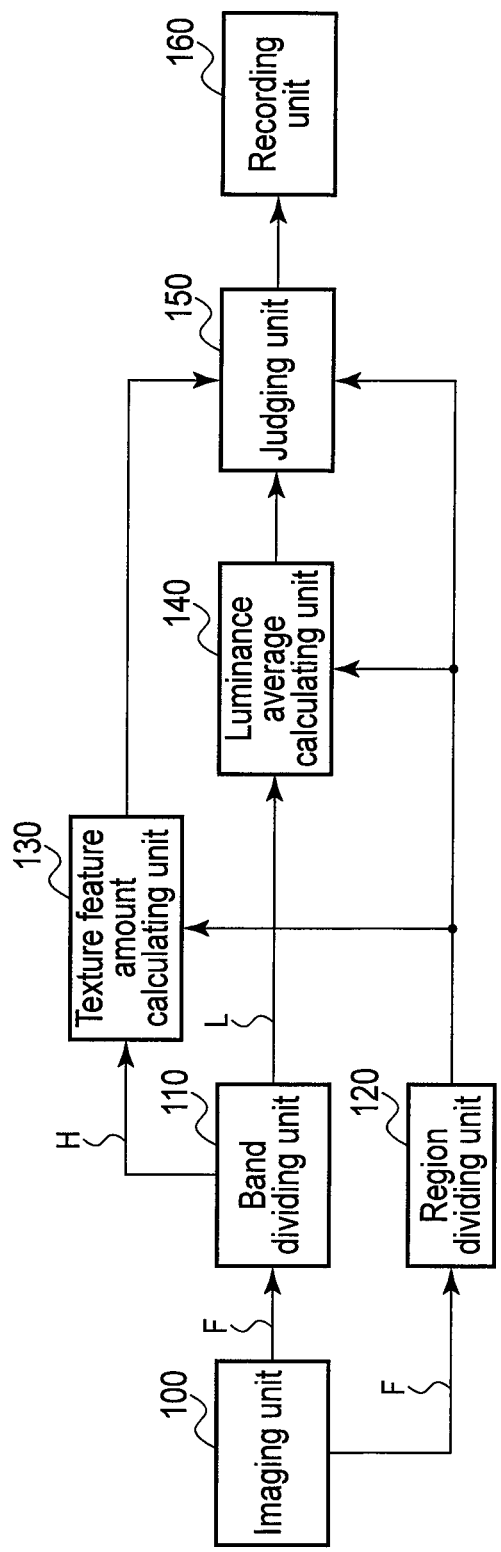
F I G. 1

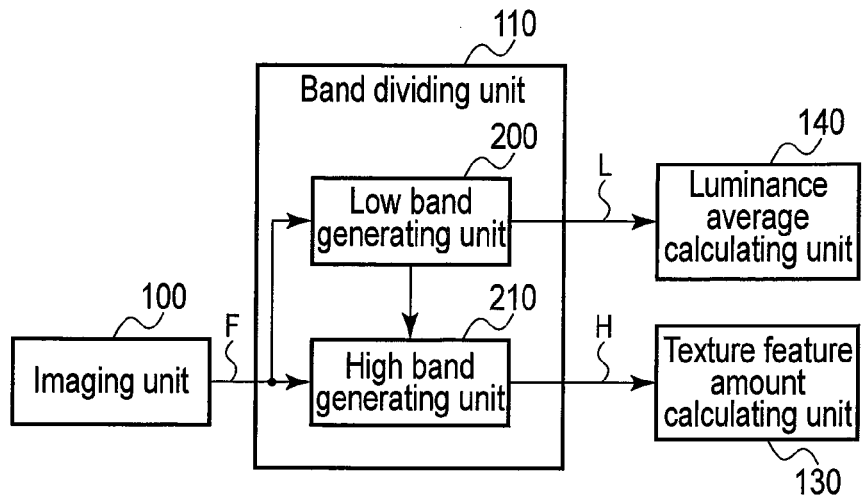
F I G. 2
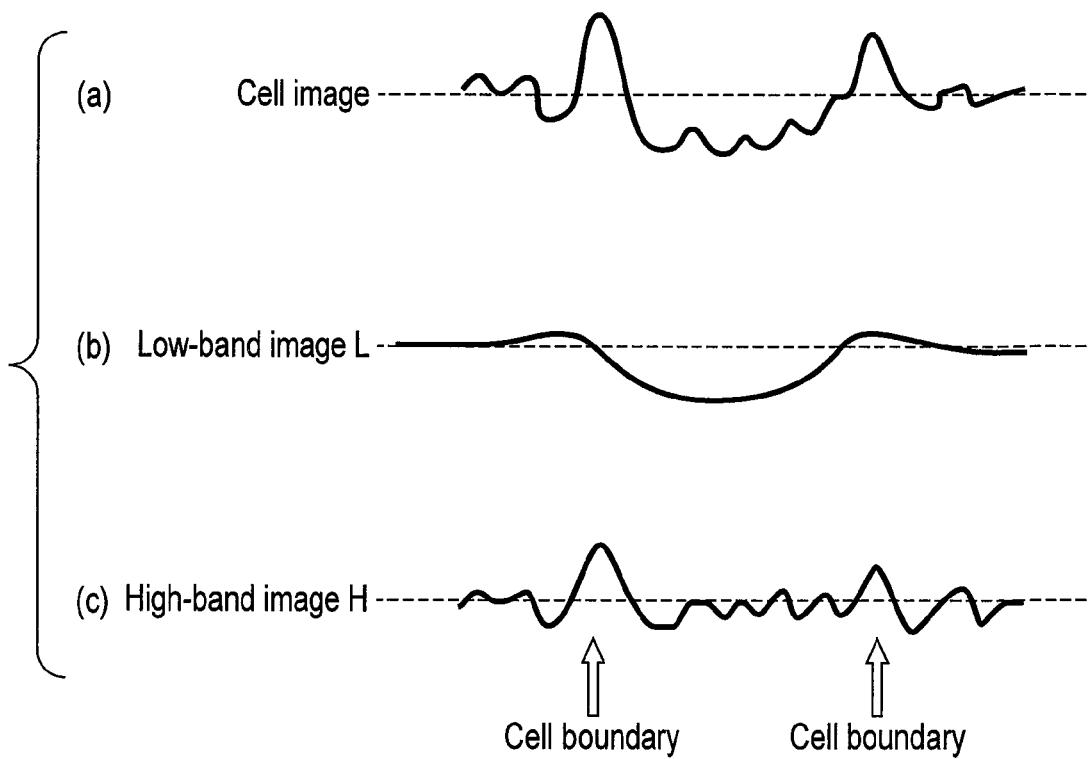
F I G. 3

Cell image

Region-divided image K

Pixel value of region of interest

Cooccurrence matrix C

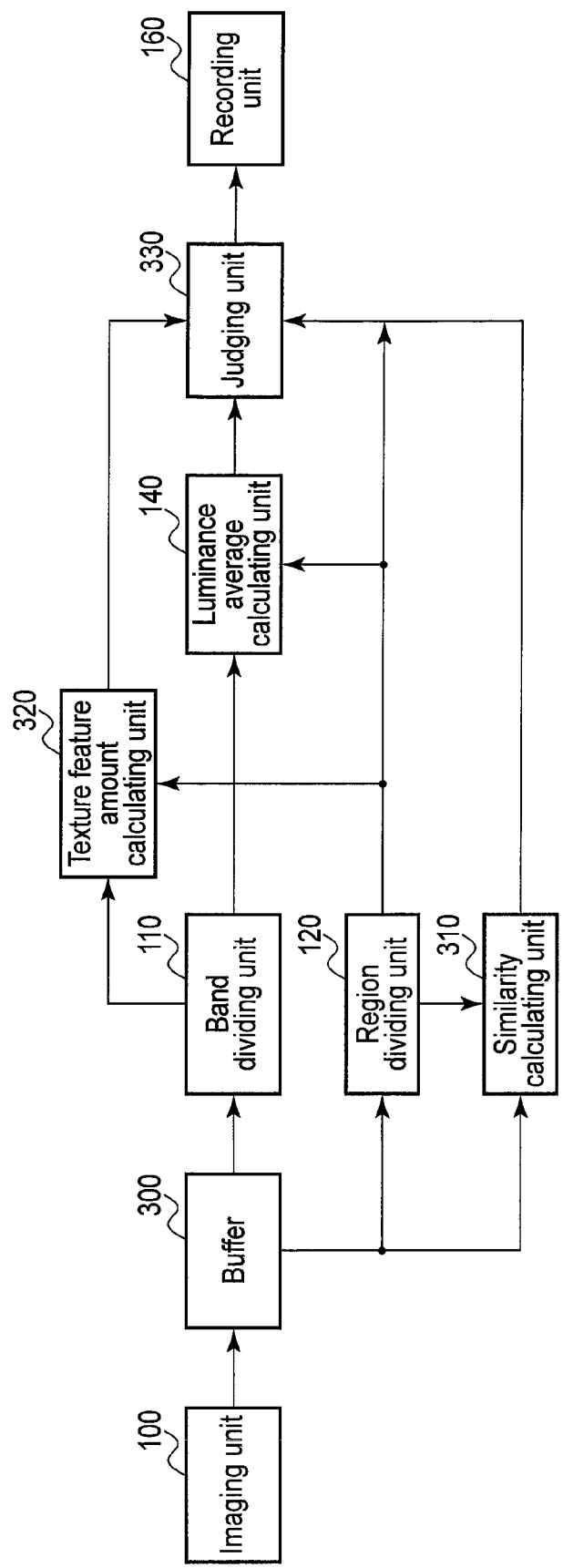
F I G. 9

NECROTIC CELL REGION DETECTION APPARATUS AND METHOD OF THE SAME, AND NON-TRANSITORY COMPUTER READABLE STORAGE MEDIUM TO STORE A NECROTIC CELL REGION DETECTION PROGRAM

CROSS-REFERENCE TO RELATED APPLICATIONS

This application is a Continuation application of PCT Application No. PCT/JP2013/070105, filed Jul. 24, 2013 and based upon and claiming the benefit of priority from prior Japanese Patent Application No. 2012-169600, Jul. 31, 2012, the entire contents of all of which are incorporated herein by reference.

BACKGROUND OF THE INVENTION

1. Field of the Invention

The present invention relates to a necrotic cell region detection apparatus and a method of the same to detect a region formed by necrotic cells from a cell image acquired by imaging using, for example, a bright field microscope, and a non-transitory computer readable storage medium to store a necrotic cell region detection program.

2. Description of the Related Art

Heretofore, in medical and life-science fields, various cell analyses using a cell image photographed through a microscope have been conducted. For example, in the studies of stem cells such as ES cells and iPS cells, the following operation is generally performed for the elucidation of cell differentiation mechanisms and the discovery and development of drugs: cell differentiation processes and morphological feature changes are observed from cell images obtained in a time-series manner, and the difference of characteristics of cells is investigated.

Regarding the analysis of the cell image, automation of troublesome operations such as the screening of individual cells that has heretofore been visually performed is becoming possible by the application of image processing technology such as image recognition. If this image processing technology is applied, it is possible to measure the degree of activity of individual cells included in the cell image by calculating the contours of the cells and detecting morphological information regarding the cells and the number of cells or the motions and movement distances of the cells.

The activities of cells are balanced by the mechanism of cell death called apoptosis (natural death) and necrosis as well as by cell proliferation resulting from cell division.

In apoptosis, a change is first made in the cell nucleus, and the cell decreases in size, forms an apoptotic body, and is then engulfed by immunocytes or the like and digested without any trace left. Meanwhile, in necrosis, the whole cell gradually inflates, the cytoplasm changes, and then the cell membrane finally bursts. At the same time, the contents of the cell remain, and cause inflammation (cytolysis).

The region in which the cell contents remain due to necrosis (hereinafter referred to as a necrotic region) is difficult to distinguish from a living cell region when individual cells are extracted in cell detection, which is likely to have an adverse effect on, for example, correct measurement of the number of cells, or evaluation of the degree of cell activity by the measurement of the number of cells. Therefore, it is necessary to correctly recognize the necrotic region in advance.

Jpn. Pat. Appln. KOKAI Publication No. 2007-20449 discloses a method intended for drug screening to judge whether a cell is a living cell or a dead cell on the basis of a morphological feature value representing the morphological feature of each cell in a cell image acquired by a microscope. More specifically, according to Jpn. Pat. Appln. KOKAI Publication No. 2007-20449, the judgment is made by the use of the amount of deviation of the contour shape of a cell from a circle or a sphere as the morphological feature value representing the morphology of the cell. A cell judged to be large in deviation amount is considered to have been significantly distorted from a circle or sphere, and is judged to be an active living cell. In contrast, a cell which is small in deviation amount and which is close to a circle or sphere is judged to be inactive and nearly dead.

BRIEF SUMMARY OF THE INVENTION

A necrotic cell region detection apparatus according to aspect of the present invention comprises an image acquiring unit which acquires a cell image group composed of cell images acquired by imaging, at multiple times, a living cell changing with time, a segmentation unit which divides the cell image acquired at a predetermined time in the cell image group into multiple regions so that the local imaging properties of the regions are uniform, a band separate unit which separates the cell image acquired at the predetermined time into multi-band images including a low-band image comprising a low-frequency component and a high-band image comprising a high-frequency component, a feature value calculating unit which calculates a texture feature value from the high-band image for each of the regions, a luminance calculating unit which calculates a luminance average value from the low-band image for each of the regions, and a judging unit which forms a feature space composed of the texture feature value and the luminance average value, and judges whether each of the regions is a region formed by necrotic cells in the feature space.

A necrotic cell region detection method according to aspect of the present invention comprises by computer processing, by computer processing, acquiring a cell image group composed of cell images acquired by imaging, at multiple times, a living cell changing with time, dividing the cell image acquired at a predetermined time in the cell image group into multiple regions so that the local imaging properties of the regions are uniform, dividing the cell image acquired at the predetermined time into multi-band images including a low-band image comprising a low-frequency component and a high-band image comprising a high-frequency component, calculating a texture feature value from the high-band image for each of the regions, calculating a luminance average value from the low-band image for each of the regions, and forming a feature space composed of the texture feature value and the luminance average value, and judging whether each of the regions is a region formed by necrotic cells in the feature space.

A non-transitory computer readable storage medium to store a necrotic cell region detection program, the necrotic cell region detection program comprises an image acquiring function which acquires a cell image group composed of cell images acquired by imaging, at multiple times, a living cell changing with time, a segmentation function which divides the cell image acquired at a predetermined time in the cell image group into multiple regions so that the local imaging properties of the regions are uniform, a band separate function which separates the cell image acquired at the predetermined time into multi-band images including a low-band image comprising a low-frequency component and a high-band image comprising a high-frequency component, a feature value calculating function which calculates a texture feature value from the high-band image for each of the regions, a luminance calculating function which calculates a luminance average value from the low-band image for each of the regions, and a discriminant function which forms a feature space composed of the texture feature value and the luminance average value, and judge whether each of the regions is a region formed by necrotic cells in the feature space.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a configuration diagram showing a first embodiment of a necrotic cell region detection apparatus according to the present invention;

FIG. 2 is a specific configuration diagram showing a band separate unit in the same apparatus;

FIG. 3 is a graph showing an example of one-dimensionally represented luminance value distributions of a cell image acquired by an imaging unit in the same apparatus and a low-band image and a high-band image generated by the band separate unit;

FIG. 9 is a configuration diagram showing a second embodiment of a necrotic cell region detection apparatus according to the present invention.

DETAILED DESCRIPTION OF THE INVENTION

First Embodiment

Figure 4:
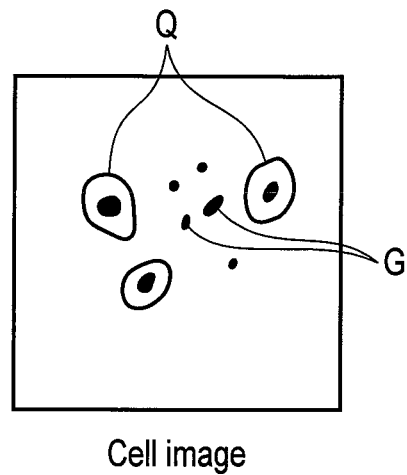
FIG. 4 is a schematic diagram showing a cell image acquired by the imaging unit in the same apparatus.

Hereinafter, a first embodiment of the present invention will be described with reference to the drawings.

FIG. 1 shows a configuration diagram of a necrotic cell region detection apparatus. The present apparatus includes an imaging unit 100, a band separate unit 110, a segmentation unit 120, a texture feature value calculating unit 130, a luminance average calculating unit 140, a judging unit 150, and a recording unit 160.

The imaging unit 100 is connected to the band separate unit 110 and the segmentation unit 120. The band separate unit 110 is connected to the texture feature value calculating unit 130 and the luminance average calculating unit 140. The segmentation unit 120 is connected to the texture feature value calculating unit 130, the luminance average calculating unit 140, and the judging unit 150. The texture feature value calculating unit 130 and the luminance average calculating unit 140 are each connected to the judging unit 150. The judging unit 150 is connected to the recording unit 160. Each of the units 100, 110, . . . , and 160 is connected to, for example, a system controller and its operation is controlled thereby.

Each of the units 100, 110, . . . , and 160 may include, for example, a central processing unit (CPU) and a storage device such as a RAM or a ROM to store an operation program. A necrotic cell detection program as the operation program is stored in the ROM.

A necrotic cell discrimination device program enables the central processing unit (CPU) as a computer to perform an image acquiring function to acquire a cell image group composed of cell images acquired by imaging, at multiple times, a living cell changing with time, a segmentation function to divide the cell image acquired at a predetermined time in the cell image group into multiple regions so that the local imaging properties of the regions are uniform, a band separate function to separates the cell image acquired at the predetermined time into multi-band images including a low-band image including a low-frequency component and a high-band image including a high-frequency component, a feature value calculating function to calculate a texture feature value from the high-band image for each of the regions, a luminance calculating function to calculate a luminance average value from the low-band image for each of the regions, and a discriminant function to judge whether each of the regions is a region formed by necrotic cells on the basis of at least the texture feature value and the luminance average value.

The necrotic cell discrimination device program includes a similarity calculating function to calculate a similarity of local luminance distributions between the cell image acquired at the predetermined time and the cell image acquired at one or both of the times before and after the predetermined time for each of the regions divided by the segmentation function.

The discriminant function judges whether each of the regions is a region formed by necrotic cells on the basis of the texture feature value, the luminance average value, and the similarity.

The imaging unit 100 images an observation target cell group to acquire a cell image. The imaging unit 100 has a function as an image acquiring unit which acquires a cell image group composed of cell images acquired by imaging, at multiple times, a living cell changing with time. The imaging unit 100 has an image pickup device such as a CCD and an A/D converter. The imaging unit 100 is, for example, a phase contrast microscope with a camera. A phase difference image of a cell group magnified by the phase contrast microscope is obtained by this camera. The imaging unit 100 is not limited to a phase contrast microscope with a camera, and is also applicable to other bright field microscopes such as a differential interference contrast microscope (DIC).

The imaging unit 100 converts a phase difference image of the cell group photographed by the phase contrast microscope to a digital signal via the image pickup device and the A/D converter, and outputs this signal as, for example, an 8-bit (256-tone) monochrome original image signal F. The monochrome original image signal F is transferred to the band separate unit 110 and the segmentation unit 120.

The phase contrast microscope uses a light diffraction phenomena, and is capable of obtaining, as contrast, a phase difference (optical path difference) of light passing through substances having different refractive indexes, and is therefore suitable for the observation of subjects such as transparent cells or microorganisms. An image photographed by the phase contrast microscope is characterized by the generation of strong contrast called a halo (artifact) on the boundary between a background region and a sample, around the details of a cell internal structure, or around a dust region of the remains of dead cells. The halo strongly appears as aura-like light especially at the boundary between a background and each cell.

In the present embodiment, the phase difference image obtained by the phase contrast microscope is a positive contrast image which appears to be photographed so that the background region is bright and a cell region is relatively dark. The phase difference image obtained by the phase contrast microscope is not limited to a positive contrast image. A negative contrast image can also be processed in the same manner as the positive contrast image by tone reversal.

The band separate unit 110 has a function as a band separate unit which separates the cell image acquired at a predetermined time into multi-band images, including a low-band image including a low-frequency component and a high-band image including a high-frequency component. More specifically, the band separate unit 110 separates the monochrome original image signal F into multi-band images including different frequency band components by predetermined multiple resolution dividing processing. The band separate unit 110 separates the monochrome original image signal F into two component images: a low-band image L including low-frequency components in the monochrome original image signal F, and a high-band image H including a large number of high-frequency components in the monochrome original image signal F.

It is preferable that the low-band image L undergoes the removal of microstructures, details, and noise present on the background region or inside the cell region in the cell image and includes a large number of high-frequency bands that make it easy to show a difference in luminance change between the background region and the cell region.

It is preferable that the high-band image H includes as many high-frequency components resulting from the edges and halos constituting the cells in the cell image as possible.

FIG. 2 shows a specific configuration diagram of the band separate unit 110. The band separate unit 110 includes, for example, a low band generating unit 200 as low-band image generating unit, and a high band generating unit 210 as high-band image generating unit. Each of the input sides of the low band generating unit 200 and the high band generating unit 210 is connected to the imaging unit 100. The low band generating unit 200 is connected to the high band generating unit 210 and the luminance average calculating unit 140. The high band generating unit 210 is connected to the texture feature value calculating unit 130.

The low band generating unit 200 smoothes the cell image to generate the low-band image L. More specifically, the low band generating unit applies a predetermined smoothing filter such as a Gaussian filter to the monochrome original image signal F transferred from the imaging unit 100, and transfers the output of this filter to the luminance average calculating unit 140 and the high band generating unit 210 as the low-band image L. In the present embodiment, the low band generating unit 200 uses the Gaussian filter for the smoothing. However, this is not a limitation. Any means for extracting low-frequency components is applicable to the low band generating unit 200.

FIG. 3 shows, in a simplified one-dimensional form, an example of a luminance value distribution of the cell image acquired by the imaging unit 100. The low band generating unit 200 smoothes the original cell image to generate the low-band image L.

FIG. 4 shows a schematic diagram of a cell image acquired by the imaging unit 100. The cell image includes living cells Q, and necrotic cells and their residuals G existing between the living cells Q.

The high band generating unit 210 subtracts the low-band image L from the cell image to generate the high-band image H. More specifically, the high band generating unit 210 finds each difference values between corresponding pixel values of the monochrome original image signal F transferred from the imaging unit 100 and the low-band image L transferred from the low band generating unit 200, and transfers the difference value to the texture feature value calculating unit 130 as the high-band image H. FIG. 3 shows an example of a luminance value distribution of the high-band image H generated by subtracting the low-band image L from the cell image.

Thus, the band separate unit 110 generates the low-band image L and the high-band image H from the monochrome original image signal F.

In the present embodiment, the monochrome original image signal F is divided into images of two bands: the low-band image L and the high-band image H. However, this is not a limitation. In the present embodiment, the monochrome original image signal F is divided into more bands by multiple resolution dimidiation, and the monochrome original image signal F is thereby divided into three or more band images. In the present embodiment, a band image in which the luminance changes of the background and the cell region stand out, and a band image including a large number of edges and halos constituting the cells, the dead cells, and others are selected from the divided band images by a predetermined condition. The predetermined condition includes, for example, threshold processing based on the contrast and dispersion of pixel values. In the present embodiment, these band images can be used as the selected low-band image L and high-band image. H, respectively.

The segmentation unit 120 includes a function as a segmentation unit configured to divide the cell image acquired at a predetermined time in the cell image group into multiple regions so that the local imaging properties of the regions are uniform. The segmentation unit 120 performs, for example, segmentation processing for the cell image, and cuts each cell in the cell image into individual regions. The segmentation processing of the cell image is processing for dividing a processing target cell image into regions composed of one or more pixel collections in the cell image which are similar in feature to each other and which are spatially close to each other.

Figure 5:
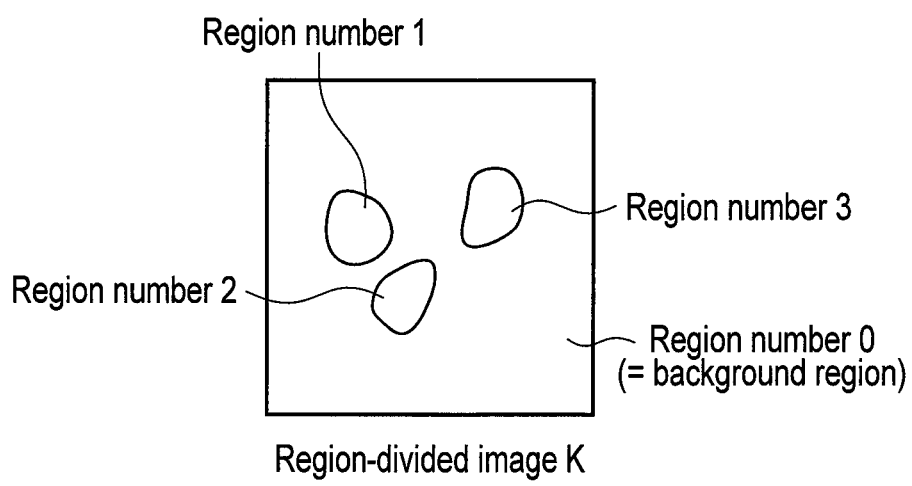
FIG. 5 is a schematic diagram showing boundary parts of cells when divided into regions by a segmentation unit in the same apparatus.

In general, in the cell image obtained by the phase contrast microscope, the luminance at the cell boundary is higher than the luminance inside the cell. In view of this characteristic of the cell image, in the present embodiment, the region division that uses a watershed method), which is a segmentation method, is performed to cut the cell image into individual cell regions. The watershed method performs division based on a luminance value gradient of the cell image, and performs division that uses, as a dividing line, a part in the image which is high in luminance value and which has a steep luminance value gradient, that is, the boundary of the cells as shown in FIG. 5. Region numbers are given to the individual divided regions by labeling processing, and a segmentation image K in which the region numbers are pixel values is generated. In FIG. 5, the cell image is divided into three cell regions, and region numbers 1, 2, and 3 are respectively given to the cell regions. A region number 0 is given to the region in which a non-cell region is a background region. The segmentation processing is not necessarily limited to the watershed method. Any technique that can accurately divide a cell region is applicable. The generated the segmentation image K is transferred to the texture feature value calculating unit 130, the luminance average calculating unit 140, and the judging unit 150.

The texture feature value calculating unit 130 includes a function as a feature value calculating unit which calculates a texture feature value based on a pixel value distribution on the high-band image H for each of the regions in the segmentation image K. The texture feature value calculating unit 130 calculates a local texture feature value for each region on the basis of each pixel value on the high-band image H. The texture feature value is a feature value based on the randomness of a pixel value distribution in the high-band image H, or a feature value based on the complexity of the pixel value distribution in the high-band image H, or a feature value based on a co-occurrence matrix of the pixels in the high-band image H.

In the present embodiment, an entropy which is widely known as a texture analyzing technique and which is one of the texture feature values based on a co-occurrence matrix is used. How to create a co-occurrence matrix regarding a predetermined pixel of interest in the high-band image H and calculate an entropy as the texture feature value is described below in the present embodiment.

A co-occurrence matrix is widely known as a statistical feature values calculating unit for calculating a statistical feature value of the texture in an image. A co-occurrence matrix represents, in the form of a matrix (co-occurrence matrix), the frequency of appearance and probability of a pixel pair included in an image and having a certain positional relation. Various texture feature values can be calculated from the co-occurrence matrix.

A tone compression image in which the number of tones of the high-band image H is previously compressed to a predetermined number is created to cut down on the size of the co-occurrence matrix and thus reduce a calculated amount. The magnitude of the co-occurrence matrix equals a square matrix of the number of tones×the number of tones. In the present embodiment, for example, original 256 tones (0 to 255) are compressed to four tones (pixel values=0 to 3).

First, a region of interest having a predetermined size around the pixel of interest in the above-mentioned tone compression image is set. In the present embodiment, the size of the region of interest is, for example, a 5×5 pixel region to simplify the explanation. The shape of the region does not need to be rectangular as in the present embodiment, and may be any shape based on the segmentation result in the segmentation unit 120.

A positional relation δ of a pixel pair to be extracted from the region of interest is then set. In the present embodiment, a pixel pair adjacent in the horizontal direction (inter-pixel distance d=1, angle θ=0°) is set. The left pixel of the pixel pair is i, and the right pixel is j. Their pixel values are Li and Lj, respectively. Note that i=0, 1, 2, 3, . . . , n, and j=0, 1, 2, 3, . . . , m.

The frequencies of appearance in each pixel pair are then counted regarding all the adjacent pixel pairs included in the region of interest, and the counted value is recorded in a co-occurrence matrix Pδ (Li, Lj). That is, in the region of interest, the frequency of the existence of the pixel pair Li and Lj is recorded in the element of the Li row and the Lj column of the co-occurrence matrix Pδ.

Figure 6A:
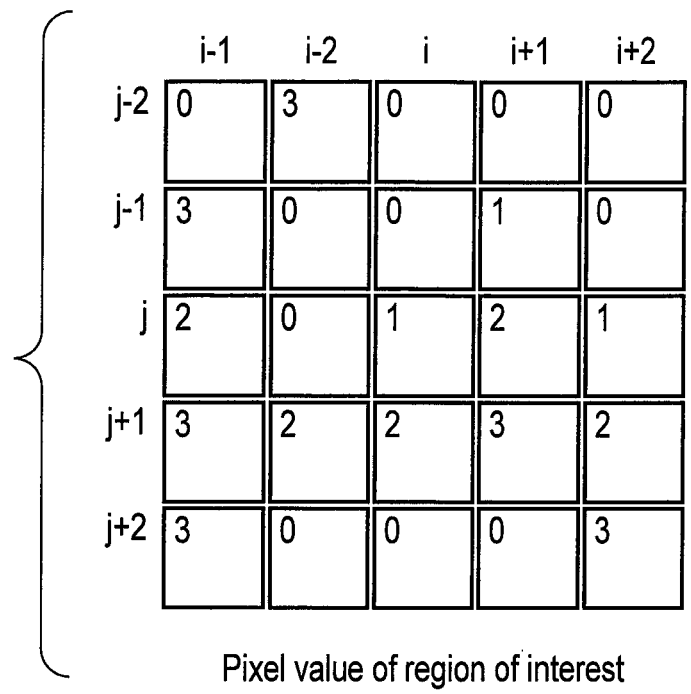
FIG. 6A is a diagram showing an example of pixel values in a region of interest applied to the same apparatus.
Figure 6B:
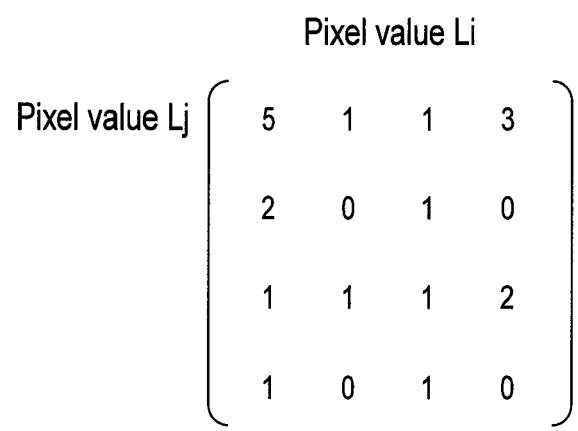
FIG. 6B is a diagram showing an example of a co-occurrence matrix calculated by counting the frequency of appearance regarding an adjacent pixel pair recorded by the same apparatus.

FIG. 6A shows a specific example of pixel values in the region of interest. FIG. 6B shows an example of a co-occurrence matrix calculated in this case. There are two pixel pairs in which Li=3 and Lj=2 in the region of interest shown in FIG. 6A, so that an element of the co-occurrence matrix Pδ (3,2)=2 in FIG. 6B. There are five pixel pairs in which Li=0 and Lj=0 in the region of interest shown in FIG. 6A, so that an element of the co-occurrence matrix Pδ(0,0)=5 in FIG. 6B.

After all the frequencies of the existence of the pixel pairs Li and Lj are recorded, each element of Pδ (Li,Lj) is divided by the total number of the frequencies of appearance and thereby normalized. A texture feature value based on a calculated co-occurrence matrix C is then calculated.

In the present embodiment, an entropy, which is the texture feature value defined by Equation (1) is used as the texture feature value. Here, L represents the magnitude (the number of tones) of the matrix. The entropy which is a texture feature value is an index to measure the randomness of the pixel value distribution. The entropy of the texture feature value is lower in value when the pixel values are more randomly included in the region of interest.

$$\text{Entropy} = -\sum_{Li=0}^{L-1} \sum_{Lj=0}^{L-1} P\delta(Li, Lj)\log\{P\delta(Li, Lj)\} \quad (1)$$

The entropy of the texture feature value calculated for each pixel of the high-band image H is transferred to the judging unit 150.

There are various definitions of texture feature values that can be calculated from the co-occurrence matrix C. For example, an angular second moment shown below or a reciprocal of variance can also be used as the texture feature value.

The angular second moment is defined as shown in Equation (2). The angular second moment is higher in value when there are a larger number of particular pixel pairs and when the uniformity is higher.

$$\text{Angular second moment} = -\sum_{Li=0}^{L-1} \sum_{Lj=0}^{L-1} P\delta(Li, Lj)^2 \quad (2)$$

The dispersion is defined as shown in Equation (3). The dispersion is higher in value when there is a greater difference of pixel values included in the region of interest and when the variation and complexity of elements are higher. Conversely, a reciprocal of the dispersion is lower.

$$\text{Dispersion} = -\sum_{Li=0}^{L-1} \sum_{Lj=0}^{L-1} |Li - Lj|^2 \; P\delta(Li, Lj) \quad (3)$$

The luminance average calculating unit 140 calculates, for each region in the segmentation image K, a luminance average value of the pixel values (luminance values) on the low-band image L included in the region. By calculating the luminance average value on the basis of the low-band image L, the luminance average calculating unit 140 can stably calculate the luminance average value of each region in the segmentation image K without being affected by noise included in the cell image or extreme variations of luminance.

The judging unit 150 judges whether the region is a necrotic region on the basis of the texture feature value of the region and the average luminance value. Thus judgment is equivalent to discriminant analysis, which involves classification into two classes, that is, a necrotic region and a non-necrotic region, on the basis of two variables (i.e., the texture feature value and the luminance average value). In the present embodiment, the necrotic region is specified on the basis of discriminant analysis that uses a linear discriminant function.

Figure 7:
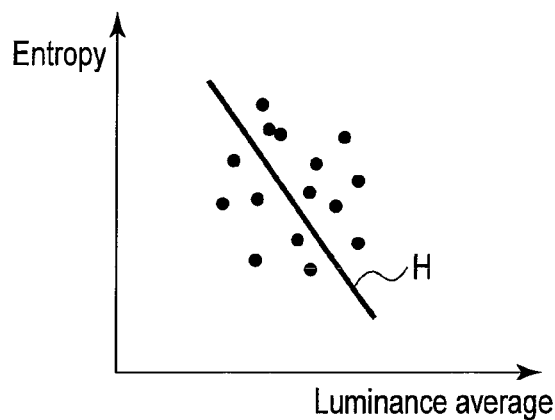
FIG. 7 is a graph illustrating how to discriminate between a necrotic region and a non-necrotic region by using a linear discriminant function in a space having an entropy and a luminance average value by a judging unit in the same apparatus.

FIG. 7 shows a graph illustrating how the judging unit 150 discriminates between a necrotic region and a non-necrotic region by using a linear discriminant function H in a vector space including the entropy and a luminance average value. The judging unit 150 discriminates between the necrotic region and the non-necrotic region with respect to the linear discriminant function H in the space including the entropy and the luminance average value.

This discriminant analysis obtains a discriminant function (a function to be the criterion for discrimination) for classification into multiple classes (groups) on the basis of learning sample data given in advance. This discriminant analysis judges to which class new data, when given, belongs by using a discriminant function. This discriminant analysis inputs 2-variable vector data including the texture feature value and the average luminance to the previously obtained linear discriminant function for each region in the segmentation image K, and thereby judges whether the region in the segmentation image K is a necrotic region. This discriminant analysis uses a Fisher's linear discriminant function which is commonly known as discriminant analysis means.

Details of the processing are described below.

Learning sample data wherein classes (hereinafter, a necrotic region is referred to as a class C1, and other non-necrotic regions are referred to as a class C2) to which regions belong are previously determined by visual confirmation is prepared.

The sample data is represented as a set of feature vectors X in which two variables including the "texture feature values" for the necrotic region or the non-necrotic region and the "average luminance" are elements, and the class (C1 or C2) to which each feature vector belongs is visually confirmed or decided. A linear discriminant function which can best separate the set of the feature vectors X into the classes C1 and C2 on a feature space based on the two variables is previously defined by a Fisher's discriminant criterion. The linear discriminant function is represented by Equation (4).

If a region feature vector Xs to be discriminated is input, the necrotic region is discriminated on the basis of whether its output value is positive or negative as shown in Equation (5).

$$f(x) = w \cdot x + b \quad (4)$$

$$w \cdot Xs + b > 0 \rightarrow C1$$

$$w \cdot Xs + b < 0 \rightarrow C2 \quad (5)$$

wherein w is a weight vector, and b is a bias term. f(x)=0 is the linear discriminant function.

It is assumed that the Fisher's discriminant criterion determines an objective function (Equation (8)) based on the ratio between an intra-class covariance Sw (Equation (6)) and an inter-class covariance SB (Equation (7)) from the sample data, and a discriminant function using the weight vector w which maximizes the objective function, that is, which decreases the intra-class covariance and which increases the inter-class covariance and can most accurately separate the data belonging to the two classes of the sample data.

$$Sw = \Sigma P(w_i) E\{(x - m_i)(x - m_i)^T | w_i\} \quad (6)$$

$$SB = \Sigma P(w_i)\{(m_i - m_0)(m_i - m_0)^T\} \quad (7)$$

$$J(w) = tr(\tilde{S}B)/tr(\tilde{S}W) \quad (8)$$

Here, the maximization of Equation (8) can be rewritten to an eigenvalue problem shown in Equation (9). The necrotic region is discriminated by the use of the linear discriminant function in which the weight vector w is determined on the basis of an eigenvector corresponding to the eigenvalue in FIG. 9. The discrimination result is transferred to the recording unit 160.

$$(SW^{-1}SB - \lambda E) \cdot u = 0 \quad (9)$$

The recording unit 160 writes, into a recording medium such as a predetermined memory or file, data in which each region in the segmentation image K is matched with the corresponding discrimination result showing whether the region is a necrotic region.

Figure 8:
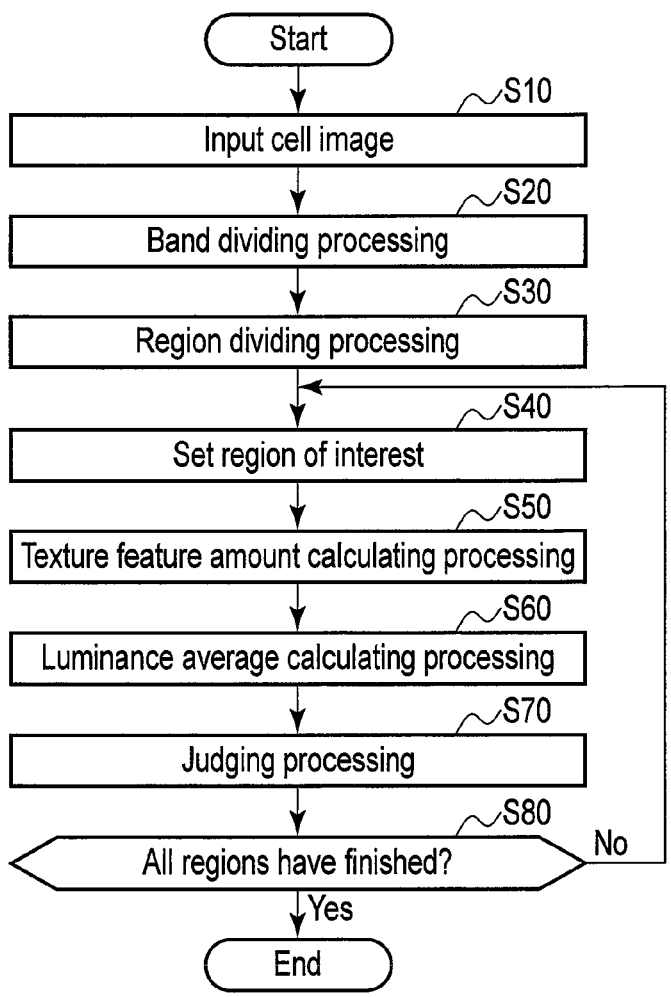
FIG. 8 is a necrotic cell region detection apparatus flowchart of the same apparatus.

Now, the operation of the apparatus having the above configuration is described with reference to a necrotic cell region detection apparatus flowchart shown in FIG. 8.

The imaging unit 100 images an observation target cell group, and outputs a monochrome original image signal F of the cell image. More specifically, the imaging unit 100 acquires a cell image group composed of cell images acquired by imaging, at multiple times, a living cell changing with time, and outputs there monochrome original image signals F.

In step S10, the monochrome original image signal F, that is, the cell image, output from the imaging unit 100 is input to the band separate unit 110.

In step S20, the band separate unit 110 separates the cell image into multi-band images including a low-band image including a low-frequency component and a high-band image including a high-frequency component. That is, the low band generating unit 200 applies a predetermined smoothing filter such as a Gaussian filter to the monochrome original image signal F transferred from the imaging unit 100, and transfers the output of this filter to generate a low-band image L shown in FIG. 3 and then transfers the low-band image L to the luminance average calculating unit 140 and the high band generating unit 210.

The high band generating unit 210 finds each difference value between corresponding pixel values of the monochrome original image signal F transferred from the imaging unit 100 and the low-band image L transferred from the low band generating unit 200, and transfers each difference value to the texture feature value calculating unit 130 as the high-band image H shown in FIG. 3.

In step S30, the segmentation unit 120 divides the cell image acquired at a predetermined time in the cell image group into multiple regions so that the local imaging properties of the regions are uniform. Region numbers are given to the individual divided regions by labeling processing, and the segmentation image K in which the region numbers are pixel values is generated.

In step S50, the texture feature value calculating unit 130 calculates a texture feature value based on a pixel value distribution on the high-band image H for each of the regions in the segmentation image K. An entropy which is one of the texture feature values based on a co-occurrence matrix is applied to the calculation of the texture feature value. In step S40, for the calculation of the texture feature value, the texture feature value calculating unit 102 sets a region of interest, and calculates an entropy which is one of the texture feature values based on a pixel value distribution on the high-band image H included in the region.

In step S60, the luminance average calculating unit 140 calculates a luminance average value of the pixel values (luminance values) on the low-band image L for each region in the segmentation image K. By calculating the luminance average value on the basis of the low-band image L, the luminance average calculating unit 140 calculates a stable in-region luminance average value which is not affected by noise included in the cell image or extreme variations of luminance.

In step S70, the judging unit 150 judges whether each of the regions is a region formed by necrotic cells on the basis of linear discrimination from the entropy as the texture feature value and the luminance average value. The judging unit 150 discriminates between the necrotic region and the non-necrotic region with respect to the linear discriminant function H in the feature space including the entropy and the luminance average value, for example, as shown in FIG. 7.

The recording unit 160 writes, into a recording medium such as a predetermined memory or file, data in which each region in the segmentation image K is matched with the corresponding discrimination result showing whether the region is a necrotic region.

In step S80, the central processing unit (CPU) judges whether the judging unit 150 has finished the discrimination processing for all the regions of the cell image. If the discrimination processing has finished for all the regions of the cell image, the central processing unit (CPU) finishes the processing. If there are unprocessed regions, the CPU proceeds to step S40.

Thus, according to the first embodiment described above, the cell image acquired at a predetermined time in the cell image group acquired by the imaging unit 100 is divided into multiple regions so that the local imaging properties of the regions are uniform. The cell image is separated into the high-band image H and the low-band image L. A texture feature value is calculated from the high-band image H for each of the regions in the segmentation image K. A luminance average value is calculated from the low-band image L for each region in the segmentation image K. Whether each of the regions in the segmentation image K is a region formed by necrotic cells is judged by linear discrimination based on the texture feature value and the luminance average value. Consequently, it is possible to accurately detect a necrotic region which prevents cell detection and which comprises remains resulting from necrocytosis.

The texture feature value is found on the basis of the high-band image H, and a local feature of the cell image can therefore be found as the texture feature value without the influence of, for example, uneven brightness over the entire cell image. A luminance average value is calculated for each of the regions in the segmentation image K on the basis of the low-band image L, and the luminance average value can therefore be stably calculated for each of the regions in the segmentation image K independently of small luminance variations. It is possible to accurately judge whether a region is formed by necrotic cells by using the texture feature value and the luminance average value.

Since the texture feature value is a feature value based on the randomness of the pixel value distribution, the necrotic cell region can be accurately distinguished on the basis of the randomness of the pixel value distribution in this region. Since the texture feature value is a characteristic amount based on the complexity of the pixel value distribution, the necrotic cell region can be accurately differentiated on the basis of the complexity of the pixel value distribution in this region. Since the texture characteristic amount is a characteristic amount based on the co-occurrence matrix, the feature of the necrotic cell region can be efficiently and accurately represented.

Second Embodiment

Now, a second embodiment of the present invention is described with reference to the drawings. The same parts as those in FIG. 1 are indicated by the same reference signs and are not described in detail.

FIG. 9 shows a configuration diagram of a necrotic cell region detection apparatus. In the present apparatus, in contrast with the previously described first embodiment, a buffer 300 and a similarity calculating unit 310 are added, and the functions of a texture feature value calculating unit 320 and a judging unit 330 are changed.

The imaging unit 100 is connected to the band separate unit 110, the segmentation unit 120, and the similarity calculating unit 310 via the buffer 300. The band separate unit 110 and the segmentation unit 120 are connected to the luminance average calculating unit 140 and the texture feature value calculating unit 320. The segmentation unit 120 is connected to the similarity calculating unit 310. The texture feature value calculating unit 320, the similarity calculating unit 310, the luminance average calculating unit 140, and the segmentation unit 120 are each connected to the judging unit 330. The judging unit 330 is connected to the recording unit 160.

Each of the units 100, 110, 120, 140, 160, 300, 310, and 330 may include, for example, a central processing unit (CPU) and a storage device such as a RAM or a ROM to store an operation program. The above-mentioned necrotic cell detection program as the operation program is stored in the ROM. A necrotic region discrimination device program enables the central processing unit (CPU) as a computer to perform the above-mentioned image acquiring function, the above-mentioned segmentation function, the above-mentioned band separate function, the above-mentioned feature value calculating function, the above-mentioned luminance calculating function, and the above-mentioned discriminant function. The necrotic region discrimination device program also includes a similarity calculating function to calculate a similarity of local luminance distributions between the cell image acquired at the predetermined time and the cell image acquired at one or both of the times before and after the predetermined time for each of the regions divided by the segmentation function. The discriminant function judges whether each of the regions is a region formed by necrotic cells on the basis of the texture feature value, the luminance average value, and the similarity.

The present second embodiment is intended for cell images acquired at multiple times to observe the changes of the cells with time. The cell images obtained by the imaging unit 100 from the past time to the present time are recorded in the buffer 300. The cell images recorded in the buffer 300 are transferred to the band separate unit 110, the segmentation unit 120, and the similarity calculating unit 310.

The band separate unit 110 separates the cell image obtained at the present time into a high-band image H and a low-band image L in the same manner as in the first embodiment.

The segmentation unit 120 generates a segmentation image K from the cell image obtained at the present time in the same manner as in the first embodiment.

The similarity calculating unit 310 calculates a similarity between the cell image obtained at the present time (hereinafter referred to as a present cell image) and the cell image obtained at the past time (hereinafter referred to as a past cell image) for each of the regions in the segmentation image K divided by the segmentation unit 120. The similarity calculating unit 310 transfers this similarity to the judging unit 330 as a similarity corresponding to multiple region-divided images K.

A living cell shifts its position by movement, but the region including necrotic cells does not move spontaneously and therefore does not shift its position even with time. Therefore, if a similarity between the present cell image and the past cell image is calculated for each region, a similarity to the necrotic cell region becomes higher.

Details of the similarity calculating unit 310 are described below.

The similarity calculating unit 310 sets a region in multiple region-divided image s K as a region of interest. The similarity calculating unit 310 sets, as a template, a region which corresponds to the region of interest in the present cell image (which is located on the same coordinates). The similarity calculating unit 310 uses the template to perform template matching for the past cell image, and calculates a similarity (a correlative value of luminance values) between position coordinates of each pixel in the past cell image and the template. The similarity is defined to be higher in value when the luminance distribution in the template is more similar to the luminance distribution of a peripheral region (having the same size as the template) around the pixels in the past cell image. The (highest) similarity showing the maximum value among the similarities calculated for all the coordinates in the past cell image is decided as the similarity of the region of interest, and transferred to the judging unit.

A known correlative value such as the sum of squared difference (SSD) or the sum of absolute difference (SAD) can be used as the similarity. In the present embodiment, SSD is used. The past cell image may be any image that is obtained at a past time compared to the present cell image. Here, the image obtained one frame before the present time is used as the past cell image.

During the template matching, similarities are calculated for all the pixels (coordinates) in the past cell image. However, the processing speed can be higher if similarities are calculated exclusively for the pixels (coordinates) included in a predetermined range around the position where the region of interest exists.

The texture feature value calculating unit 320 calculates a texture feature value from the high-band image H generated by the band separate unit 110 for each of the regions in the segmentation image K. The texture feature value is a feature value based on the histogram of the pixel value (luminance) distributions in the high-band image H in the region. That is, the texture feature value calculating unit 320 calculates a texture feature value which is different from the texture feature value according to the previously described first embodiment and which is based on the luminance histogram of the high-band image H. The texture feature value calculating unit 320 calculates a dispersion of the luminance histogram as a standard to indicate the texture complexity.

More specifically, the texture feature value calculating unit 320 sets a region in the segmentation image K as a region of interest. The texture feature value calculating unit 320 calculates a luminance histogram Hist[Lv] for the region of interest. Lv represents a luminance value (the pixel value of the high-band image), and takes a value within the range of "0 to 255".

The texture feature value calculating unit 320 calculates a pixel value average Ave in the region of interest, and calculates a dispersion (complexity) of the luminance histogram in accordance with Equation (10).

$$\text{Complexity} = \sum_{Lv=0}^{255} (Lv - Ave)^2 \times Hist[Lv] / PCall \quad (10)$$

PCall represents the number of pixels in the region of interest. The complexity of the texture included in the region of interest is higher if the dispersion (complexity) of the luminance histogram is higher, so that the texture feature value calculating unit 320 calculates a reciprocal of the dispersion (complexity) of the luminance histogram (−1/the dispersion (complexity) of the luminance histogram) and then transfers the reciprocal to the judging unit 330.

The judging unit 330 judges whether the region in the segmentation image K is a region formed by necrotic cells in a three-dimensional feature space composed of the texture feature value, the luminance average value, and the similarity.

Although the judging unit 150 according to the previously described first embodiment performs discrimination by the linear discriminant analysis, the judging unit 330 according to the present second embodiment performs discrimination by a nonlinear discriminant analysis that uses a linear support vector machine (hereinafter referred to as an SVM) and a kernel function. Linear SVM is a linear discriminant analysis method, but it can perform nonlinear discriminant analysis when combined with nonlinear mapping into a high-dimensional space using the kernel function.

Linear SVM is described next. Linear SVM determines a hyperplane (Equation (11)) for classifying a feature vector (three variables in the present embodiment) into two classes on the basis of learning sample data. When a region feature vector Xs to be discriminated is input, the linear SVM judges the necrotic region on the basis of whether the output value of the region feature vector Xs is positive or negative as shown in Equation (12).

$$f(x)=w\cdot x+b \quad (11)$$

$$w\cdot Xs+b>0 \rightarrow C1$$

$$w\cdot Xs+b<0 \rightarrow C2 \quad (12)$$

wherein w is a weight vector, and b is a bias term. f(x)=0 indicates the hyperplane serving as a discriminant boundary. To find the weight vector w and the bias term b, an objective function shown in Equation (13) has only to be minimized.

$$\min \tfrac{1}{2}\|w\|^2 + C\Sigma\epsilon i \quad (13)$$

wherein, $yi(w\cdot xi+b) \geq 1-\epsilon i$, $\epsilon i \geq 0$
wherein yi is a label, and takes a value 1 or −1. ε is a slack variable, and is a parameter to permit a certain degree of erroneous judgment when two groups (group C1 or C2) cannot be separated in the hyperplane. C is a parameter representing a limit of an erroneous judgment, and is experimentally set when the SVM is used.

The objective function can be transformed as shown in Equation (14) by using Lagrange's method of undetermined multipliers for a Lagrange's multiplier α.

$$\max \Sigma\alpha - (\tfrac{1}{2})\Sigma\alpha i \cdot \alpha j \cdot yi \cdot yj \cdot xi^T xj$$

wherein, $0 \leq \alpha i \leq C$, $\Sigma i \cdot yi = 0$ \quad (14)

By mapping to a high-dimensional feature space η using the kernel function φ, linear SVM cab be extended to nonlinear SVM. The weight w in the high-dimensional feature space η mapped by the kernel function φ is represented as in Equation (15) by the use of the coefficient α.

$$W = \Sigma \alpha i \cdot yi \cdot \phi(xi) \quad (15)$$

A discriminant function is represented as in Equation (16).

$$F(\phi(x)) = \sum \alpha i \cdot yi \cdot \phi(x) \cdot ^T \phi(xi) + b \quad (16)$$
$$= \sum \alpha i \cdot yi \cdot k(x, xi) + b$$

Here, the objective function is represented as in Equation (17).

$$\max \Sigma \alpha - (\tfrac{1}{2}) \Sigma \alpha i \cdot \alpha j \cdot yi \cdot yj \cdot k(x,xi)$$

$$\text{wherein, } 0 \le \alpha i \le C, \ \Sigma \alpha i \cdot yi = 0 \quad (17)$$

Here, a commonly used Gaussian kernel is used as the kernel function.

Now, the operation of the apparatus having the above configuration is described with reference to a necrotic cell region detection apparatus flowchart shown in FIG. 10. The same steps as the steps shown in FIG. 8 are indicated by the same step numbers and are not described in detail.

In step S90, the central processing unit (CPU) records, in the buffer 300, cell images obtained from a past time to the present time by the imaging unit 100.

In step S20, the band separate unit 110 separates the cell image into multi-band images including a low-band image including a low-frequency component and a high-band image including a high-frequency component.

In step S30, the segmentation unit 120 divides the cell image acquired at a predetermined time in the cell image group into multiple regions so that the local imaging properties of the regions are uniform.

In step S100, the texture feature value calculating unit 320 calculates a texture feature value from the high-band image H generated by the band separate unit 110 for each of the regions in the segmentation image K. The texture feature value calculating unit 320 calculates a texture feature value based on the luminance histogram of the high-band image H different from the texture feature value according to the previously described first embodiment. Here, the texture feature value calculating unit 320 calculates a dispersion of the luminance histogram as a standard to indicate the texture complexity.

In step S60, the luminance average calculating unit 140 calculates, for each region in the segmentation image K, a luminance average value (average luminance value) of the pixel values (luminance values) on the low-band image L included in the region.

In step S110, the CPU judges whether the cell image input from the imaging unit 100 and then recorded in the buffer 300 is a first image. When judging that the cell image is the first image, the CPU proceeds to step S130, and the judging unit 150 judges whether the region is a region formed by necrotic cells on the basis of the texture feature value and the luminance average value alone without using the similarity of the region.

If the cell image is the second or subsequent image, the similarity calculating unit 310, in step S120, calculates a similarity between the present cell image obtained at the present time and the past cell image obtained at the past time for each of the regions in the segmentation image K divided by the segmentation unit 120. The similarity calculating unit 310 transfers this similarity to the judging unit 330 as a similarity corresponding to the region in the segmentation image K.

Figure 10:
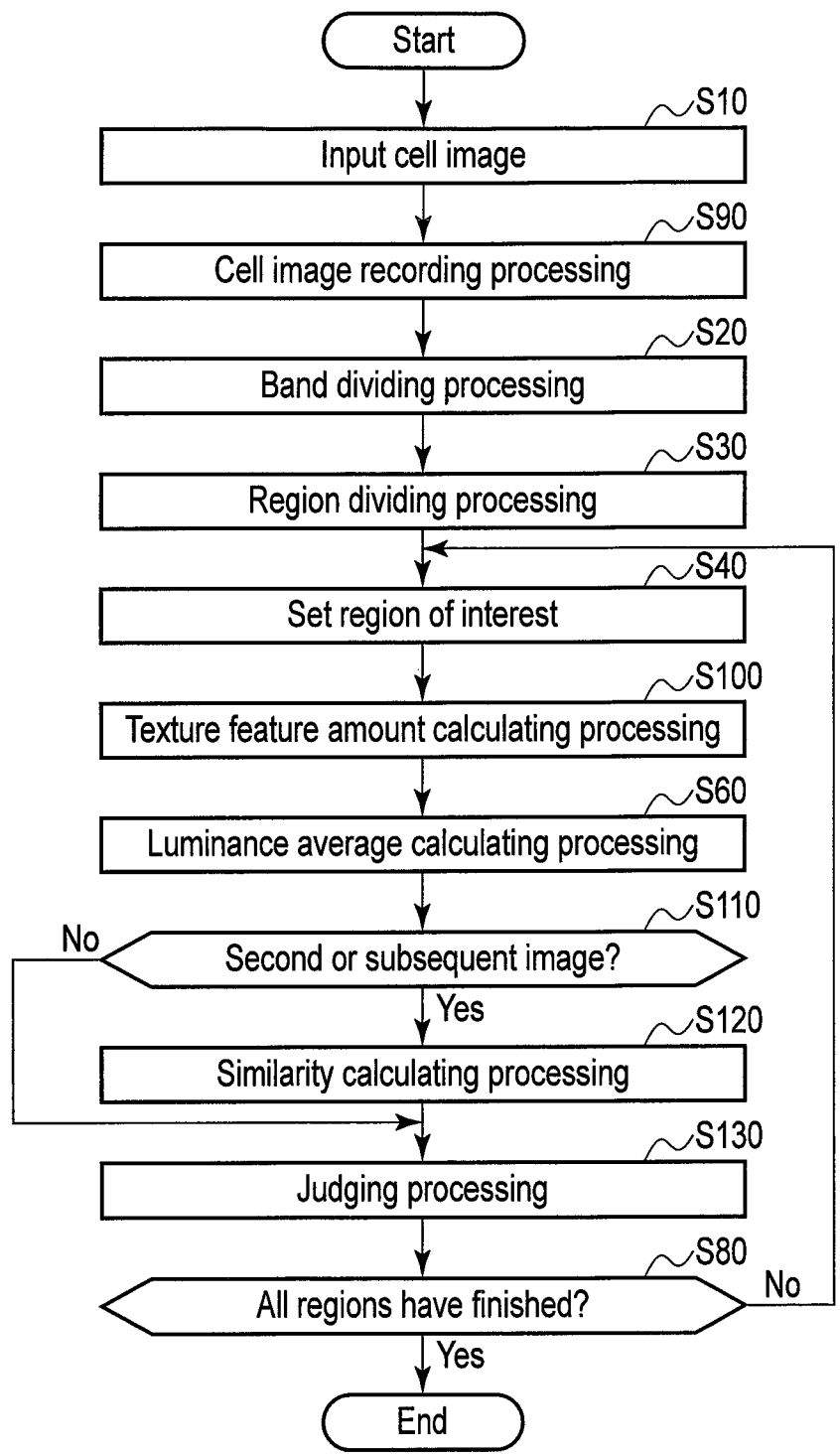
FIG. 10 is a necrotic cell region detection apparatus flowchart of the same apparatus.

In step S130, the judging unit 330 judges whether the region in the segmentation image K is a region formed by necrotic cells in a three-dimensional feature space composed of the texture feature value, the luminance average value, and the similarity as shown in FIG. 10.

Thus, according to the second embodiment described above, a similarity is calculated between the present cell image obtained at the present time and the past cell image obtained at the past time for each of the regions in the segmentation image K. Whether the region in the segmentation image K is a region formed by necrotic cells is judged on the basis of the texture feature value, the luminance average value, and the similarity. Consequently, advantageous effects similar to the advantageous effects according to the previously described first embodiment can be provided. The necrotic region and the non-necrotic region can be accurately discriminated by performing the nonlinear discrimination based on the entropy, the average luminance value, and the similarity.

What is claimed is:

1. A necrotic cell region detection apparatus comprising:
    an image acquiring unit which acquires a cell image group composed of cell images acquired by imaging, at multiple times, multiple living cell changing with time;
    a segmentation unit which divides the cell image acquired at a predetermined time in the cell image group into multiple regions so that the local imaging properties of the regions are uniform;
    a band separate unit which separate s the cell image acquired at the predetermined time into multi-band images including a low-band image comprising a low-frequency component and a high-band image comprising a high-frequency component;
    a feature value calculating unit which calculates a texture feature value from the high-band image for each of the regions;
    a luminance calculating unit which calculates a luminance average value from the low-band image for each of the regions; and
    a judging unit which forms a feature space composed of the texture feature value and the luminance average value, and judges whether each of the regions is a region formed by necrotic cell in the feature space.

2. The necrotic cell region detection apparatus according to claim 1, further comprising:
    a similarity calculating unit which calculates a similarity of local luminance distributions between the cell image acquired at the predetermined time and the cell image acquired at least one of the times before and after the predetermined time for each of the regions divided by the segmentation unit,
    wherein the judging unit forms a feature space composed of the texture feature value, the luminance average value, and the similarity, and judges whether each of the regions is formed by necrotic cell in the feature space.

3. The necrotic cell region detection apparatus according to claim 2, wherein:
    the similarity calculating unit calculates, for each of the regions, a mean square error between the cell images intended for the periphery of the region as a similarity.

4. The necrotic cell region detection apparatus according to claim 1, wherein the band separate unit includes,
    a low-band image generating unit which smooths the cell image to generate the low-band image, and a high-band image generating unit which subtracts the low-band image from the cell image to generate the high-band image.

5. The necrotic cell region detection apparatus according to claim 1, wherein:
the texture feature value is a feature value based on the randomness of a pixel value distribution.

6. The necrotic cell region detection apparatus according to claim 1, wherein:
the texture feature value is a feature value based on the complexity of a pixel value distribution.

7. The necrotic cell region detection apparatus according to claim 1, wherein:
the texture feature value is a feature value based on a co-occurrence matrix.

8. The necrotic cell region detection apparatus according to claim 1, wherein:
the texture feature value is a feature value based on the histogram of a pixel value.

9. The necrotic cell region detection apparatus according to claim 1, wherein:
the judging unit judges whether each of the regions is a region formed by the necrotic cell by linear discriminant analysis based on a linear discriminant function in the feature space.

10. The necrotic cell region detection apparatus according to claim 1, wherein:
the judging unit judges whether each of the regions is a region formed by the necrotic cell by nonlinear discriminant analysis in the feature space.

11. The necrotic cell region detection apparatus according to claim 1, wherein:
the cell image group is acquired by a bright field microscope.

12. A necrotic cell region detection method comprising:
by computer processing,
acquiring a cell image group composed of cell images acquired by imaging, at multiple times, multiple living cell changing with time;
dividing the cell image acquired at a predetermined time in the cell image group into multiple regions so that the local imaging properties of the regions are uniform;
dividing the cell image acquired at the predetermined time into multi-band images including a low-band image comprising a low-frequency component and a high-band image comprising a high-frequency component;
calculating a texture feature value from the high-band image for each of the regions;
calculating a luminance average value from the low-band image for each of the regions; and
forming a feature space composed of the texture feature value and the luminance average value, and judging whether each of the regions is a region formed by necrotic cell in the feature space.

13. The necrotic cell region detection method according to claim 12, wherein,
in the dividing the cell image into the multiple regions, a similarity of local luminance distributions between the cell image acquired at the predetermined time and the cell image acquired at least one the times before and after the predetermined time is calculated for each of the regions, and
in the judging whether each of the regions, a feature space composed of the texture feature value, the luminance average value, and the similarity is formed, and whether each of the regions is a region formed by necrotic cell in the feature space is judged.

14. A non-transitory computer readable storage medium to store a necrotic cell region detection program, the necrotic cell region detection program comprising:
an image acquiring function which acquires a cell image group composed of cell images acquired by imaging, at multiple times, multiple living cell changing with time;
a segmentation function which divides the cell image acquired at a predetermined time in the cell image group into multiple regions so that the local imaging properties of the regions are uniform;
a band separate function which separates the cell image acquired at the predetermined time into multi-band images including a low-band image comprising a low-frequency component and a high-band image comprising a high-frequency component;
a feature value calculating function which calculates a texture feature value from the high-band image for each of the regions;
a luminance calculating function which calculates a luminance average value from the low-band image for each of the regions; and
a discriminant function which forms a feature space composed of the texture feature value and the luminance average value, and judge whether each of the regions is a region formed by necrotic cell in the feature space.

15. The non-transitory computer readable storage medium to store a necrotic cell region detection program according to claim 14, wherein the necrotic cell region detection program further comprises:
a similarity calculating function which calculates a similarity of local luminance distributions between the cell image acquired at the predetermined time and the cell image acquired at least one of the times before and after the predetermined time for each of the regions divided by the segmentation function, and
the discriminant function forms a feature space composed of the texture feature value, the luminance average value, and the similarity, and judges whether each of the regions is a region formed by necrotic cell in the feature space.

* * * * *